Feb. 24, 1959 W. H. BASELT 2,874,811
BRAKE BEAM SUPPORT
Filed Oct. 7, 1954 2 Sheets-Sheet 1
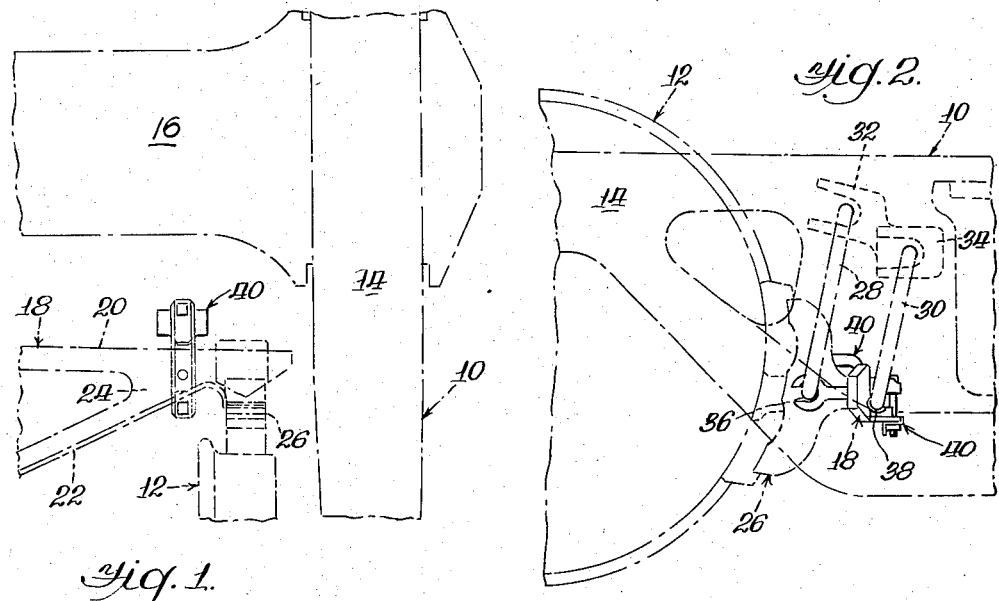
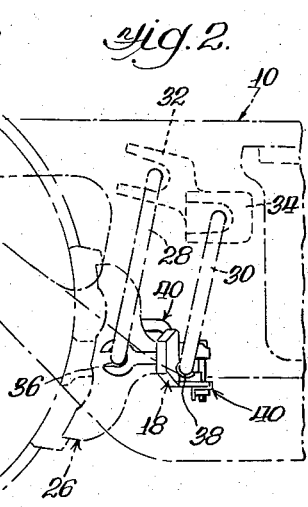
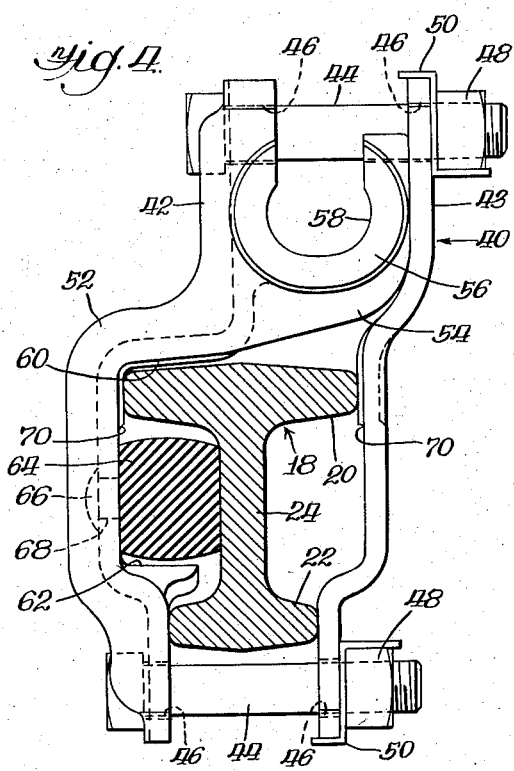
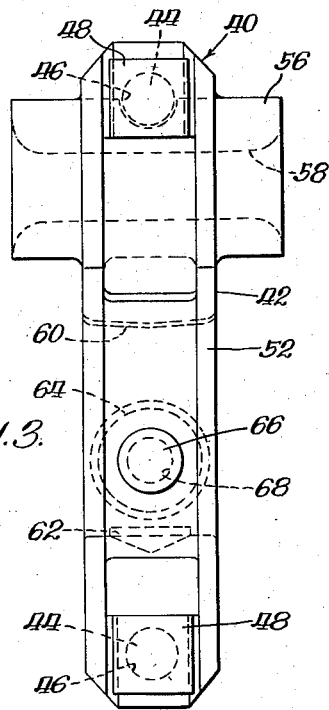
INVENTOR.
Walter H. Baselt
BY
Walter L. Schlegel, Jr. Atty.

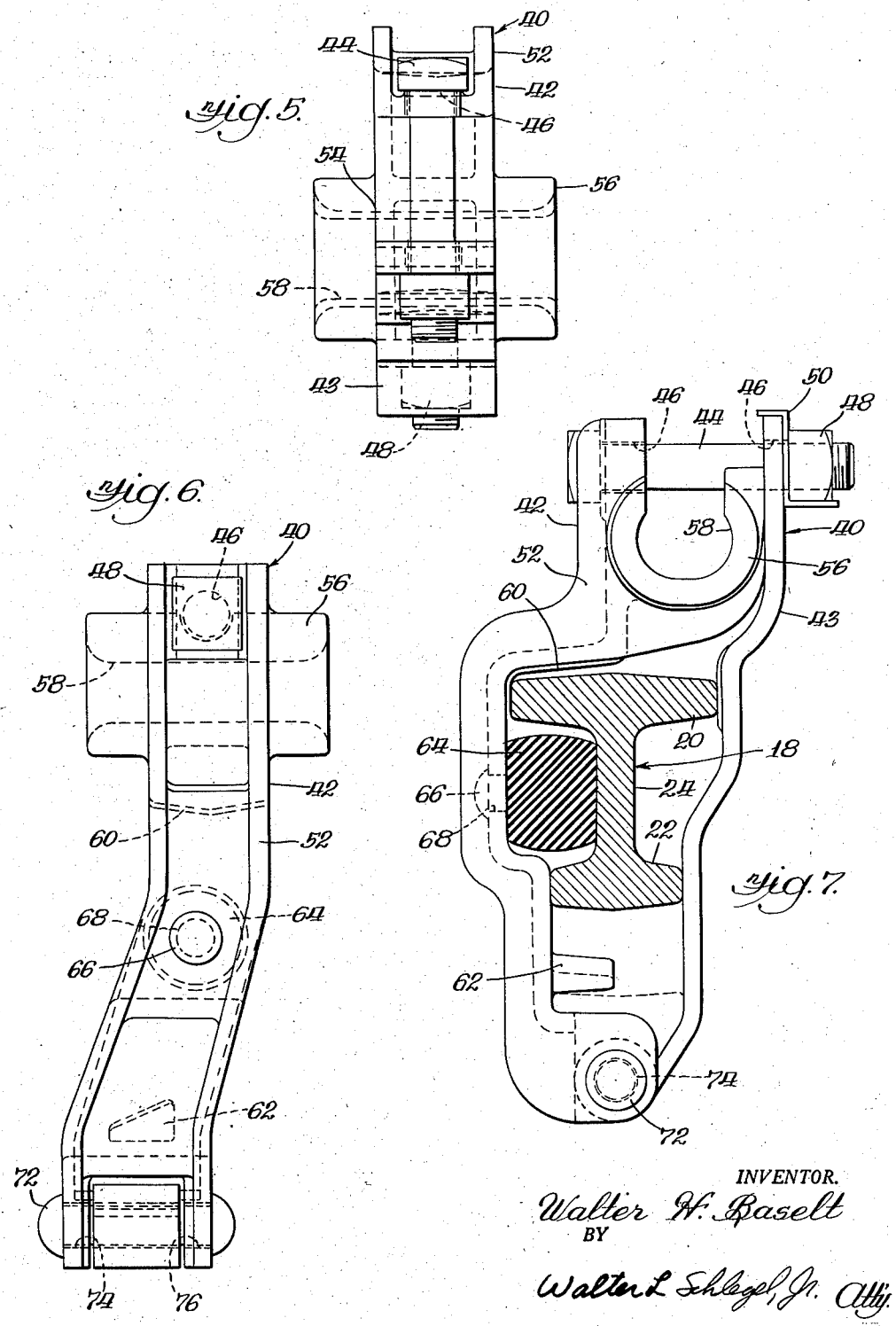

United States Patent Office 2,874,811
Patented Feb. 24, 1959

2,874,811

BRAKE BEAM SUPPORT

Walter H. Baselt, Flossmoor, Ill., assignor to American Steel Foundries, Chicago, Ill., a corporation of New Jersey Application October 7, 1954, Serial No. 460,826

8 Claims. (Cl. 188—207)

This invention relates to brake beams for railway car trucks and more particularly to a novel auxiliary suspension bracket attached to a hanger type brake beam.

The invention comprehends a novel clamping arrangement, wherein a resilient element is employed between the suspension bracket and the brake beam received within said bracket.

Accordingly, a primary object of the invention is to provide a resilient clamping connection between a suspension bracket and a brake beam received therein.

Another object of the invention is the provision of a simplified structure wherein a standard rubber pad may be utilized in a suspension bracket for a brake beam.

Another object of the invention is the provision of a resilient suspension bracket for a brake beam that is both economical to produce and easy to assemble and disassemble.

Still another object of the invention is to provide a non-rattling securing arrangement for a suspension bracket and brake beam that will not be loosened by the shocks normally anticipated in the operation of railway car truck.

These and other objects of the invention will become apparent from an examination of the following description and drawings, wherein:

Figure 1 is a fragmentary top plan view of a portion of a railway car truck embodying the invention, wherein the position of the novel bracket relative to the brake beam and truck frame is illustrated, Figure 2 is a fragmentary side elevational view of the structure shown in Figure 1, Figure 3 is a top plan view of one embodiment of the invention, Figure 4 is a side elevational view of the structure shown in Figure 3, Figure 5 is a front elevational view of the structure shown in Figure 4, Figure 6 is a top plan view of another embodiment of the invention, and Figure 7 is a side elevational view of the structure shown in Figure 6.

It will be noted that certain parts of the structure have been intentionally omitted from certain of the views where it was believed that they can be illustrated to better advantage in other views.

Describing the invention in detail and referring first to Figures 1 and 2, wherein the embodiment illustrated in Figures 3 to 5 is shown positioned in the truck frame, only portions of the truck frame being shown, the frame generally designated at 10 is supported by wheel and axle assembly 12 and comprises side frames 14 interconnected by a transverse member 16.

The brake beam generally designated 18 comprises T-shaped compression and tension members 20 and 22 respectively, said members being connected centrally by a strut (not shown) and being merged at their outer ends to form gussets 24. At the outboard ends of the beam, brake shoe assemblies 26 are carried, the assemblies being engageable with adjacent wheel and axle assemblies.

The beam may be supported from the frame at each end by means of hangers 28 and 30 connected at their upper ends to the frame carried hanger brackets 32 and 34 and at their lower ends to a pivot 36 adjacent the brake head assembly, and pivot 38 in suspension bracket 40, respectively.

The embodiment of the suspension bracket illustrated in Figures 3–5 comprises an upper flange 42 and a bottom flange 43 spaced from each other and interconnected by means of bolts 44 received in openings 46 of the respective flanges. Bolts 44 may be retained in place by unit grip nuts 48 and locking plates 50.

The top flange 42 has upwardly extending ribs 52 at the sides thereof, said ribs extending longitudinally of the bracket to give it added strength. Also depending from the sides of the rearward portion of the bracket are vertical walls 54, said walls being arcuate in shape and having thereon bosses 56 defining openings 58 extending transversely of the bracket in which is received the pivot 38 for the connection with the hanger 30.

The central portion of the top flange has a somewhat crank shape form (as seen in Figure 4) so as to provide an abutment wall 60 for the compression member of the brake beam. Adjacent the forward portion of the brake beam, a stop lug 62 may be affixed or made integral with the top flange so as to retain the beam in position. Forwardly the top flange may be formed in a crank shape so as to abut the tension member of the beam.

The bottom flange is arcuately formed (as seen in Figure 4) at the rearward portion thereof so as to abut the depending wall 54 of the top flange. The forward section of the bottom flange may be formed in a crank shape so as to abut the opposite side of the tension member of the beam.

As best seen in Figures 1 and 4, the end of the beam is received in the opening 70 which is defined by the top and bottom flanges of the bracket, the tension and compression members of the beam being perpendicular to the flanges of the bracket, and the gussets of the beam being parallel to the flanges of the bracket.

A resilient member 64, preferably a rubber pad cylindrical in shape, may be positioned between and abutably engaging the gusset and either or both of the flanges.

The resilient element may be retained in position by pin or bolt 66 which is insertable through opening 68 of the adjacent flange.

The wall 60 of the top flange and the stop lug 62 have converging surfaces to accommodate the positioning of the bracket on either the right hand or left hand side of the brake beam.

The alternate embodiment illustrated in Figures 6 and 7 is generally similar to the first mentioned embodiment except that the flanges are hinged at one end by hinge pin 72 receivable in opening 74 and 76 of the top and bottom flanges, respectively. The end of the top flange being bifurcated to receive the end of the bottom flange, the hinge pin having an axis perpendicular of the bolt 44 at the opposite end of the bracket.

I claim:

1. In a support arrangement, a brake beam having compression and tension members merging at their ends and a gusset formed by the merger of said members, a hanger, a beam support bracket carried by said hanger, said bracket comprising a pair of flanges spaced from each other intermediate their ends and interconnected at their ends and engaging said brake beam therebetween, a compressed resilient element abutably engaging said gusset and one of said flanges, one of said flanges presenting adjacent one end thereof an opening in which is detachably mounted said hanger.

2. In a hanger carried suspension bracket arrangement, a hanger, a brake beam having outboardly converging and merging T section compression and tension members and a gusset formed by the merger of said members and extending therebetween at the ends thereof, flanges extending transversely along opposite sides of said brake beam abutably engageable with said tension and compression members, a compressed resilient element interposed between said gusset and one of said flanges and secured on the latter, stop means on one of said flanges serving to limit movement of said beam relative to said flange, one of said flanges having a U-shaped bearing recess to receive said hanger, means operable to interconnect said flanges and to close the entrance to said recess.

3. In a brake beam arrangement, the combination of a truck frame, a hanger carried by said frame, a suspension bracket carried by said hanger, a brake beam carried by said suspension bracket, said suspension bracket comprising a pair of clamp arms spaced from each other so as to form an opening therebetween in which to receive said brake beam, a compressed resilient element in said opening interposed between said beam and one of said arms and secured to the latter, connections between said arms at the ends thereof, and spaced jaws on one of said arms to receive said hanger, one of said connections bridging said jaws whereby said hanger is detachably mounted between the jaws.

4. In a suspension arrangement for supporting a brake beam from a railway car truck, a bracket comprising a pair of clamp arms spaced from each other intermediate their ends to define a beam opening therebetween, means interconnecting the ends of the clamp arms, a brake beam received within said beam opening, and a hanger secured to and depending from said truck, one of said clamp arms presenting an aperture in which is received said hanger, one of said connection means being operable to close said aperture and lock said hanger therein.

5. A suspension arrangement according to claim 4 wherein said clamp arms are pivotally interconnected at one end thereof.

6. In a brake beam suspension arrangement, the combination of: a hanger; a brake beam; and a bracket for supporting the beam from the hanger, said bracket comprising spaced arms defining therebetween an opening for receiving said beam, one of said arms defining a portion of an aperture for receiving said hanger; and means interconnecting said arms operable to retain said beam and said hanger in said opening and said aperture, respectively.

7. In a brake beam suspension arrangement, the combination of: a hanger; a brake beam; and a bracket for supporting the beam from the hanger, said bracket comprising spaced arms defining therebetween an opening for receiving said beam, one of said arms defining a portion of an aperture for receiving said hanger; and means disposed adjacent opposite ends of said arms operable to interconnect said arms and clamp said beam therebetween in said opening, said means also being operable to retain said hanger within said aperture.

8. In a brake beam suspension arrangement, the combination of: a hanger; a brake beam; and a bracket for supporting the beam from the hanger, said bracket comprising spaced arms defining therebetween an opening for receiving said beam, one of said arms defining a portion of an aperture for receiving said hanger; and means interconnecting said arms operable to clamp said beam therebetween in said opening, said means also being operable to close said aperture and retain said hanger therein.

References Cited in the file of this patent

UNITED STATES PATENTS

| | | |
|---|---|---|
| 430,755 | Robischung | June 24, 1890 |
| 497,514 | Bemis et al. | May 16, 1893 |
| 758,176 | Graham | Apr. 26, 1904 |
| 919,565 | Fowler | Apr. 27, 1909 |
| 1,426,506 | Retzer et al. | Aug. 22, 1922 |
| 1,707,536 | Nuetzel | Apr. 2, 1929 |
| 2,067,596 | Busse | Jan. 12, 1937 |
| 2,093,797 | Baselt | Sept. 21, 1937 |
| 2,105,995 | Busse | Jan. 18, 1938 |
| 2,196,249 | Busse | Apr. 9, 1940 |
| 2,383,955 | Busse | Sept. 4, 1945 |
| 2,499,549 | Walker | Mar. 7, 1950 |
| 2,722,292 | Opsahl | Nov. 1, 1955 |
| 2,786,555 | Tack | Mar. 26, 1957 |